(12) United States Patent
Fernando

(10) Patent No.: US 11,849,816 B2
(45) Date of Patent: Dec. 26, 2023

(54) ELECTRONIC WEARABLE DEVICE

(71) Applicant: Zinfanite Technologies, Inc., Torrance, CA (US)

(72) Inventor: Jana Mahen Fernando, Torrance, CA (US)

(73) Assignee: Zinfanite Technologies, Inc., Torrance, CA (US)

( * ) Notice: Subject to any disclaimer, the term of this patent is extended or adjusted under 35 U.S.C. 154(b) by 300 days.

(21) Appl. No.: 17/477,819

(22) Filed: Sep. 17, 2021

(65) Prior Publication Data

US 2022/0087374 A1    Mar. 24, 2022

Related U.S. Application Data

(60) Provisional application No. 63/080,954, filed on Sep. 21, 2020.

(51) Int. Cl.
| | |
|---|---|
| *H04R 5/033* | (2006.01) |
| *A44C 15/00* | (2006.01) |
| *G06F 1/16* | (2006.01) |
| *G10K 11/28* | (2006.01) |
| *H04R 1/32* | (2006.01) |
| *H04R 1/10* | (2006.01) |
| *H04R 1/34* | (2006.01) |

(52) U.S. Cl.
CPC .......... *A44C 15/0015* (2013.01); *G06F 1/163* (2013.01); *G06F 1/1656* (2013.01); *G10K 11/28* (2013.01); *H04R 1/1033* (2013.01); *H04R 1/323* (2013.01); *H04R 1/345* (2013.01); *H04R 5/0335* (2013.01)

(58) Field of Classification Search
CPC ........ H04R 1/028; H04R 1/1033; H04R 1/08; H04R 1/323; H04R 1/345; H04R 3/00; H04R 5/0335; H04M 1/05; H04M 1/724094; H04M 1/72421; A44C 25/001; A44C 15/0015
See application file for complete search history.

(56) References Cited

U.S. PATENT DOCUMENTS

| | | | |
|---|---|---|---|
| 9,398,790 B1* | 7/2016 | Ketcher | A44C 25/001 |
| 2008/0161023 A1* | 7/2008 | Ko | A44C 15/0015 |
| | | | 455/462 |
| 2011/0216931 A1* | 9/2011 | Bui | H04R 1/1091 |
| | | | 381/333 |
| 2014/0338397 A1* | 11/2014 | Andreini, III | A44C 25/002 |
| | | | 63/1.14 |
| 2021/0307462 A1* | 10/2021 | Dailey | G08B 21/24 |

* cited by examiner

*Primary Examiner* — Huyen D Le
(74) *Attorney, Agent, or Firm* — Enable IP, P.C.

(57) ABSTRACT

An electronic wearable device is disclosed. The electronic wearable device includes a pendant attached to a necklace; the pendant comprising a base and a plurality of interchangeable faceplates; wherein each of the plurality of interchangeable faceplates has a different design and is configured to attach to the base to hide the base.

9 Claims, 3 Drawing Sheets

ELECTRONIC WEARABLE DEVICE

CROSS REFERENCE TO RELATED PATENT APPLICATION

This application claims the priority of U.S. Provisional Application No. 63/080,954, filed Sep. 21, 2020, the entirety of which is hereby incorporated by reference.

FIELD

This relates generally to electronic wearable devices, and more particularly, to an electronic wearable device with interchangeable faceplates and an acoustic reflector for directing sound.

BACKGROUND

Electronic wearable devices are gaining popularity. They come in many shapes and forms. For example, headsets are designed to capture and play audio including voice calls. However, headsets and other existing forms of electronic wearable devices are not made to be customized especially as it pertains to their aesthetic look. The inability to customize the look of an electronic wearable makes it difficult to please the user's taste in all use cases and situations.

SUMMARY

This disclosure relates to a wearable electronic device with an interchangeable faceplate. The wearable electronic device can function as a speakerphone. The wearable electronic device can incorporate an acoustic reflector for improving speaker sound quality.

DETAILED DESCRIPTION OF THE PREFERRED EMBODIMENTS

In the following description of preferred embodiments, reference is made to the accompanying drawings which form a part hereof, and in which it is shown by way of illustration specific embodiments, which can be practiced. It is to be understood that other embodiments can be used and structural changes can be made without departing from the scope of the embodiments of this disclosure.

Figure 1:
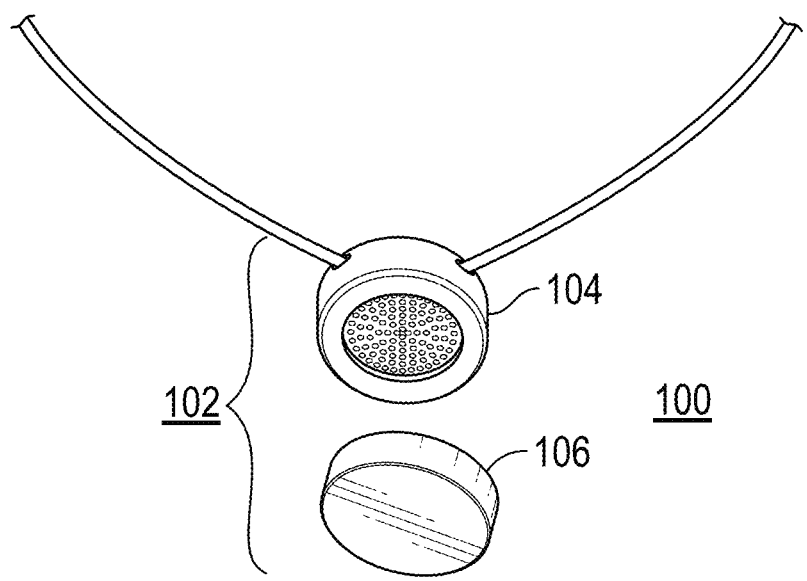
FIG. 1 illustrates a base of an exemplary electronic wearable device, according to an embodiment of the disclosure.
Figure 2A:
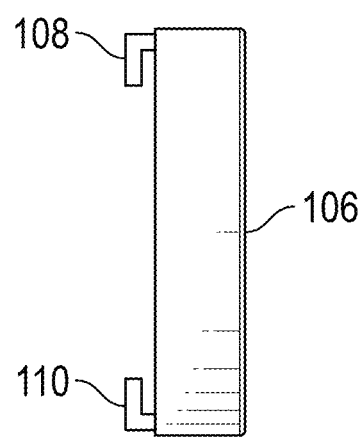
FIG. 2a is a side view of a detachable faceplate of the exemplary electronic wearable device of FIG. 1, according to an embodiment of the disclosure.
Figure 2B:
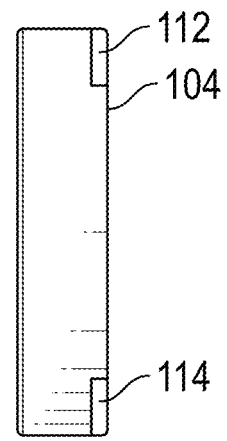
FIG. 2b is a side view of a base of the exemplary electronic wearable device of FIG. 1, according to an embodiment of the disclosure.

This disclosure generally relates to electronic wearable devices (or "devices" as referred to hereinafter). In one embodiment, as illustrated in FIG. 1, a wearable electronic device 100 that can be worn around the neck like a necklace attached with a pendant 102 is disclosed. The pendant 102 can include a base (or "base component") 104 and a detachable faceplate 106. The base 104 can include the primary electronics that provide functions for the wearable device 100. The detachable faceplate 106 can be attached to the base 104 by any suitable mechanisms. In one example, as shown in FIG. 2a, the faceplate 106 can include two small clips 108, 110 on opposite ends. The clips 108, 110 can fit into corresponding openings 112, 114 on the base 104 shown in FIG. 2b. It should be understood that different number of clips can be used to attach the faceplate 106 to the base 104 and the location of the clips 108, 110 and openings 112, 114 on the faceplate and base, respectively, can be different from those shown in FIGS. 2a and 2b.

Other mechanisms can also be used. As example, the base 104 can be magnetic and the faceplate 106 can be metal (or vice versa) and the two can attach to each other magnetically. In one embodiment, the base (or the faceplate) may include a small magnetic ring along its outer edge. Alternatively, a magnet can be positioned in the center of the faceplate 106. As other examples, the faceplate 106 can be snapped or twisted on or off the base 104.

The base 104 and detachable faceplate can be made of waterproof material.

The base 104 includes the electronic components that provide various functions such as speakerphone functions. The faceplate 106 primarily serves for aesthetic purpose. In the embodiment of FIG. 1, the overall design of the device 100 can mimic the appearance of a necklace to increase the device's appeal to potential users. By allowing for an interchangeable faceplate 106 that can be detached easily from the base 104, the devices disclosed herein allow their wearers choose from an assortment of faceplate designs to give the device different looks.

Figure 3A:
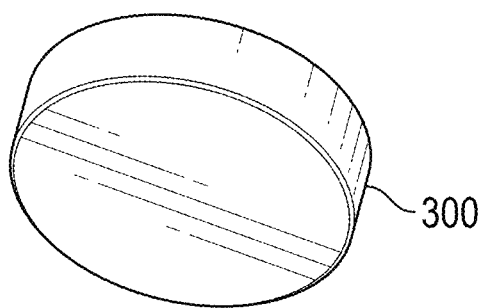
FIGS. 3a-3c illustrate exemplary interchangeable faceplates that can be attached to the base of FIG. 1, according to embodiments of the disclosure.
Figure 3B:
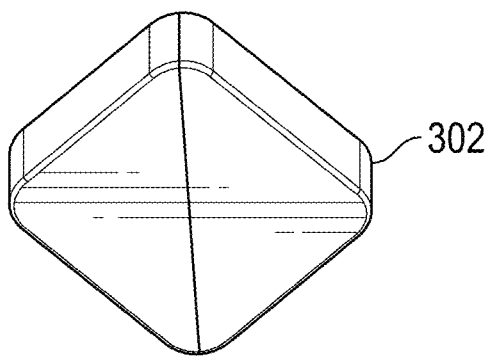
Figure 3C:
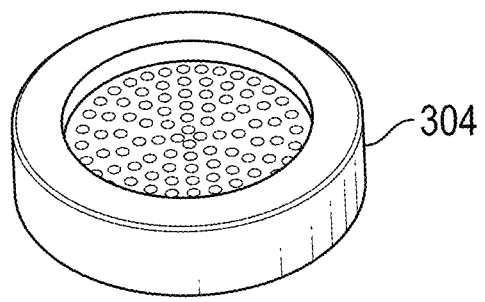

FIGS. 3a-3c illustrates various exemplary designs of the faceplate 106. For example, FIG. 3a illustrates a faceplate 300 in a circular shape. FIG. 3b illustrates a faceplate 302 in a diamond shape. FIG. 3c illustrates a faceplate 304 in an oval shape. It should be understood that the faceplate can be in any shape not illustrated in the figures. The faceplate can also be in different colors, sizes, be made of different material, and have different finishes such as metallic, ceramic, etc. In some embodiments, the faceplates can be designed to mimic a piece of jewel or a normal pendant so as to conceal the fact that an electronic device is hidden in the base behind it.

As mentioned above, the base 104 of the electronic wearable device 100 can include electronic components. In the embodiment illustrated in FIG. 4, the base 400 can be a speakerphone that includes a speaker enclosure 402 having a front end 404. The speaker enclosure 402 seals the speaker inside with one side of the speaker exposed to the exterior. This way, speaker enclosure 402 amplifies and helps the speaker emit sound. Generally, the face (i.e., front end) of the speaker is where most sound output is.

As illustrated in the figure, the front end 404, to which the faceplate (not shown in FIG. 4) is attached, faces the direction away from the wearer of the electronic wearable device. The backside 406 of the base 400 is against the chest of the wearer of the device when the device is worn like a necklace. This can create a problem in that the wearer of the device may not hear the sound from the speaker 402 clearly as the sound is transmitting in the direction 410 away from him.

Figure 4:
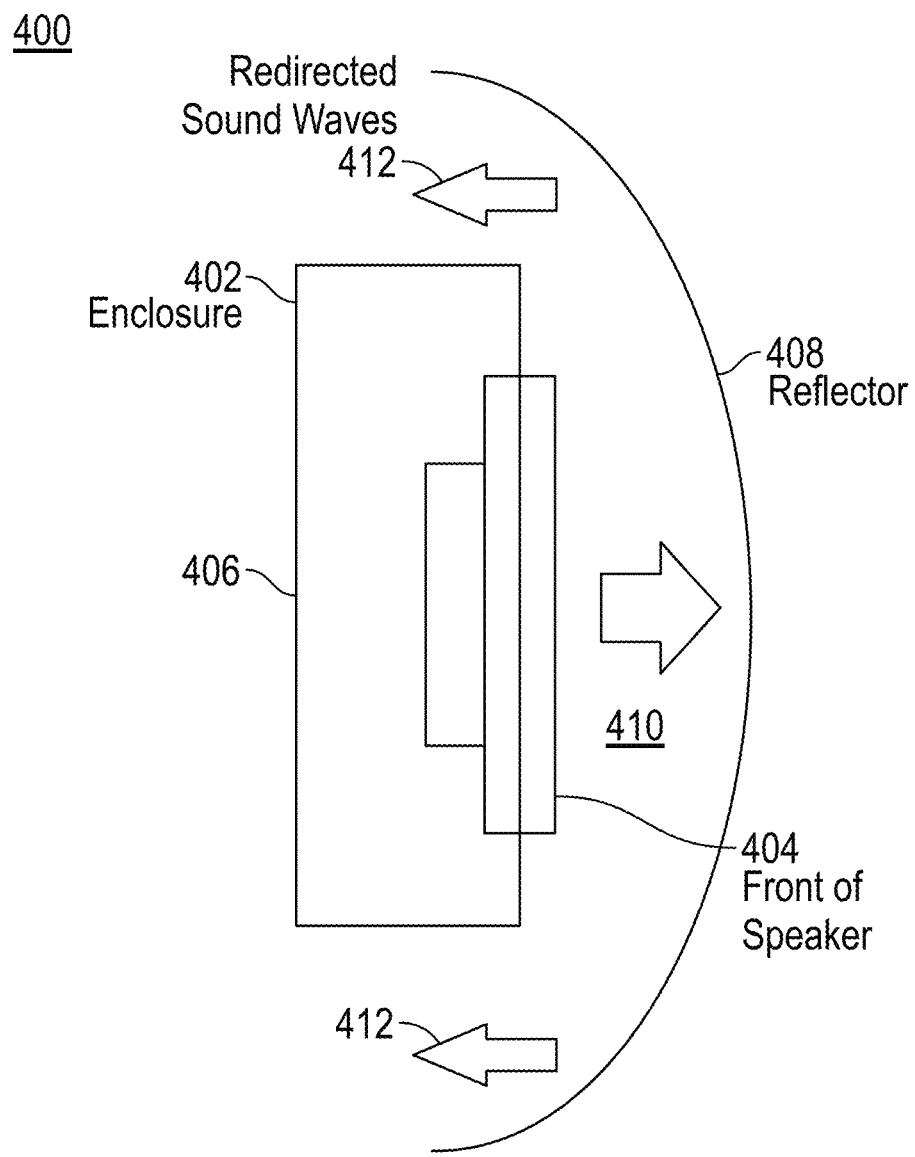
FIG. 4 is a diagram illustrating the exemplary internal components of the base of an electronic wearable device illustrated in FIG. 1, according to an embodiment of the disclosure.

In the embodiment illustrated in FIG. 4, a reflector 408 with a concave surface facing the front of the speaker 406 is positioned in front of the front end of the speaker 404. The reflector 408 can be made of sound deflecting material. Sound coming from the speaker 402 is reflected by the reflector 408's concave surface in the opposite direction 412 towards the wearer (not shown in FIG. 3) rather than away from the device into open space. The reflector 408 is designed and shaped to direct sound in an optimal direction that maximizes volume to the wearer. This allows the wearer to hear the sound more clearly while wearing the device. It should be understood that the reflector's sound reflecting surface can be of any shape and/or have any curvature based on the intended direction of the reflected sound from the speaker. The reflecting surface does not need to be symmetrical. Although the direction 412 shown in FIG. 1 appears to be directly toward the back of the speaker 402, it should be understood that the reflector 408 can be designed to reflect or deflect the sound in any direction.

The same design with the reflector 408 placed in front of the front end of the speaker 404 enclosure also works when there are listeners beside the wearer of the device. These other listeners can be to the side of the speaker enclosure 402, in which case, the speaker is also not pointed in the direction of these listeners. Again, the reflector 408, with its curved sound reflecting surface facing the front end of the speaker 404, can redirect the sound to the listeners instead of allowing the sound to dissipate away from them. In other words, the illustrated design allows for a sealed speaker 402 enclosure that may produce higher fidelity sound while redirected the sound with the reflector 408.

Although in the embodiments discussed above, the electronic wearable devices mimic common necklaces, it should be understood that the device can also be in the form of a shirt clip, tie clip, wrist band/watch and the like that incorporates the interchangeable faceplates and, optionally, a sound reflector to direct sound from a speaker inside the device.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An electronic wearable device comprising:
   a pendant attached to a necklace;
   the pendant comprising a base and a plurality of interchangeable faceplates;
   wherein each of the plurality of interchangeable faceplates has a different design and is configured to attach to the base to hide the base; and
   wherein the base comprises:
   a speaker enclosure comprising a front end configured to output sound from the speaker enclosure; and
   a reflector having a concave sound reflecting surface for deflecting the sound from the speaker enclosure, the reflector positioned with the concave sound reflecting surface facing the front end of the speaker enclosure.

2. The electronic wearable device of claim 1, wherein each of the plurality of interchangeable faceplates is attachable to the base by at least one clip.

3. The electronic wearable device of claim 2, wherein a first of the plurality of interchangeable faceplates is in circular shape, a second of the plurality of interchangeable faceplates is in diamond shape; and a third of the plurality of interchangeable faceplates is in oval shape.

4. The electronic wearable device of claim 1, wherein each of the plurality of interchangeable faceplates comprises a magnet and the base comprises metal so each of the plurality of interchangeable faceplates is attachable to the base magnetically.

5. The electronic wearable device of claim 1, wherein the concave sound reflecting surface reflects the sound from the speaker enclosure in a direction of a wearer of the electronic wearable device.

6. The electronic wearable device of claim 1, wherein the base and each of the plurality of interchangeable faceplate are made of waterproof material.

7. The electronic wearable device of claim 1, wherein the electronic wearable device has an appearance of a necklace.

8. A necklace comprising:
   a pendant attached to a chain;
   the pendant comprising a base and a plurality of interchangeable faceplates;
   wherein each of the plurality of interchangeable faceplates has a different design and is configured to attach to the base to hide the base; and
   wherein the base comprises:
   a speaker enclosure comprising a front end configured to output sound from the speaker enclosure; and
   a reflector having a concave sound reflecting surface for deflecting the sound from the speaker enclosure, the reflector positioned with the concave sound reflecting surface facing the front end of the speaker enclosure.

9. The necklace of claim 8, wherein the concave sound reflecting surface reflects the sound from the speaker enclosure in a direction of a wearer of the necklace.

* * * * *